UNITED STATES PATENT OFFICE.

CHRISTOPHER RIS, OF BASLE, SWITZERLAND, ASSIGNOR TO JOHN R. GEIGY & CO., OF SAME PLACE.

BLACK COTTON DYE.

SPECIFICATION forming part of Letters Patent No. 636,066, dated October 31, 1899.

Application filed June 3, 1899. Serial No. 719,282. (Specimens.)

*To all whom it may concern:*

Be it known that I, CHRISTOPHER RIS, a citizen of the Republic of Switzerland, residing in Basle, in the Republic of Switzerland, have invented certain new and useful Black Cotton Dyes, of which the following is a specification.

The present invention refers to new black coloring-matters especially useful for dyeing cotton fast-black shades, said coloring-matters being obtained by melting a paraämidophenol compound—such as paraämidophenol paraämidocresol ($CH_3 : OH : NH_2 = 1 : 2\,5$)—with acetyl compounds and sulfur at a temperature from about 200° to 300° centigrade. To the melting mixture a diluent may be added in order to accomplish a moderate reaction—as, for instance, glycerin, ethyleneglycol, chlorhydrin, kresol, anthracene, naphtalene, and analogous substances.

Example I: Forty-four kilos of paraämidophenol, twenty-six kilos of acetanilid, and forty kilos of sulfur are melted together in a vessel furnished with a stirring mechanism at a temperature of 210° to 230° centigrade till the development of sulfureted hydrogen will almost be finished. Then the mass is pulverized. In order to dissolve the same, it is boiled with about five hundred liters of water and fifty kilos of caustic-soda lye of 40° Baumé, after which the solution is precipitated by addition of acids or of bicarbonate of sodium and the coloring-matter filtered off, pressed, dried, and pulverized. It forms a black powder difficultly soluble in hot water with dark greenish-blue color, soluble in diluted caustic-alkali lye with dark bluish-black color, easily soluble in a watery solution of sodium sulfid with olive color, difficultly soluble in alcohol with greenish-blue color, insoluble in ether and benzene, soluble in concentrated sulfuric acid with bluish-black color. When dissolved in a solution of sodium sulfid and evaporated to dryness, it forms a black powder easily soluble in water with olive color, insoluble in alcohol, ether, and benzene, and soluble in concentrated sulfuric acid with olive-black color.

Example II: Sixty kilos of the coloring matter of Example I are dissolved in about five hundred liters of boiling water, with addition of ninety kilos of crystallized sodium-sulfid. Then the solution is evaporated to siccity, best in a vacuum, and the coloring-matter pulverized. In a hot bath containing sodium sulfid and common salt or Glauber's salt the color dyes unmordanted cotton dark blackish-olive shades, which turns, by means of oxidizing agents—such as oxygen of the air, bichromate of potasse, sulfate of copper, or chlorid of iron—into deep black of great fastness.

Example III: Forty-four kilos of paraämidophenol, thirty kilos of paraämidoacetanilid, thirty kilos of glycerin, and forty kilos of sulfur are melted as described in the first example and also further treated in the same manner. The thus-obtained coloring-matter shows almost the same properties as that of the first example. Its solution in concentrated sulfuric acid is of a dark greenish-black. It dyes unmordanted cotton in a hot bath of sodium sulfid and salt dark olive-black shades, which turn by oxidation into deep black.

In these examples instead of the named acetyl compounds other acetyl compounds may be used, such as acetoluidins, acetxylidins, acetnaphtylamids, paraoxyacetanilid, paranitroacetanilid, paraämidoacetorthotoluidin. The thus-formed coloring-matters show the same properties as above described. The respective quantities of amidophenols, acetyl compounds, sulfur, and diluent may be varied, as also the temperature from 200° to about 300° centigrade.

The chemical constitution of the new colors cannot yet be ascertained.

I claim—

As an article of manufacture, the new black dyestuff obtained from paraämidophenol, an acetyl compound and sulfur, which forms a black powder easily soluble in water with an olive color, soluble in concentrated sulfuric acid with olive-black color, insoluble in alcohol, ether and benzene, and possessing the dyeing properties substantially as described.

In testimony that I claim the foregoing as my invention I have signed my name in presence of two subscribing witnesses.

CHRISTOPHER RIS.

Witnesses:
GEORGE GIFFORD,
JOHN G. PLATNER.